April 25, 1967   A. PRICHODJKO   3,316,550
NAVIGATION SYSTEM
Filed July 8, 1963   13 Sheets-Sheet 1

Inventor:
Alexander Prichodjko
By: Spencer & Kaye
Attorneys

April 25, 1967 A. PRICHODJKO 3,316,550
NAVIGATION SYSTEM
Filed July 8, 1963 13 Sheets-Sheet 2

Inventor:
Alexander Prichodjko
By: Spencer & Kaye
Attorneys

Inventor:
Alexander Prichodjko
By: Spencer & Kaye
Attorneys

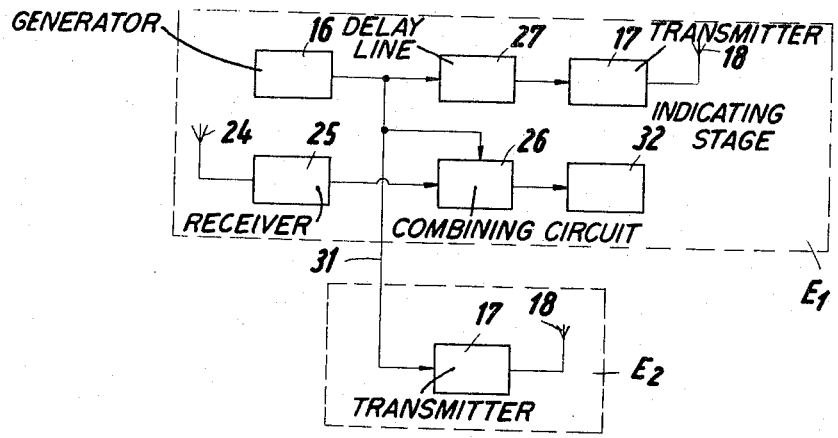
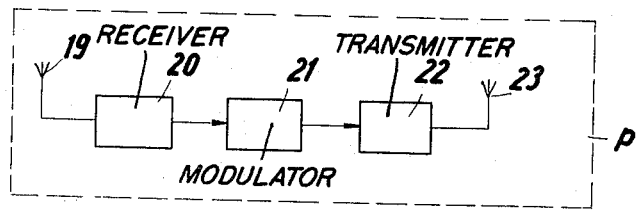
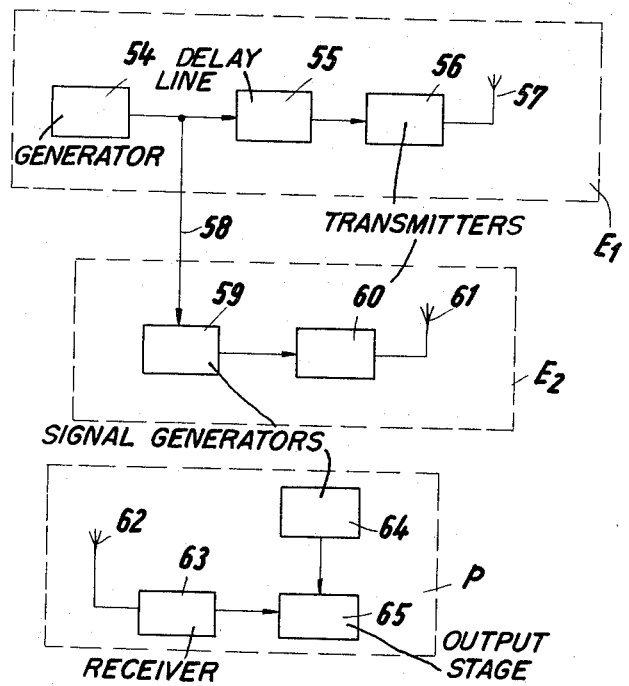
Fig. 7
Fig. 11

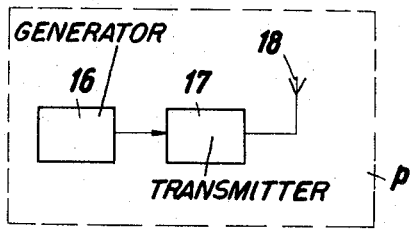
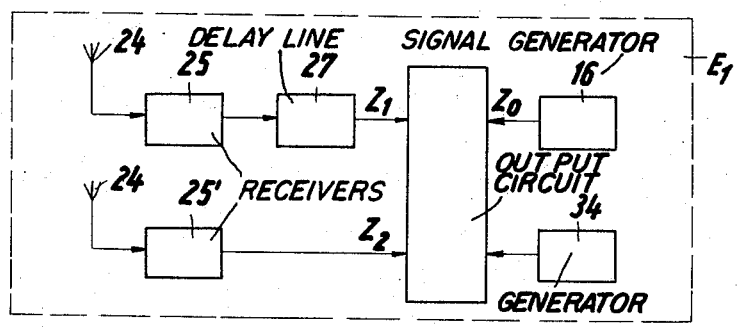
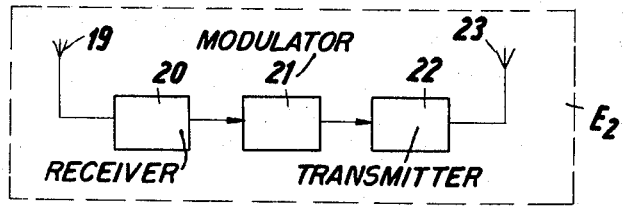
Fig. 17
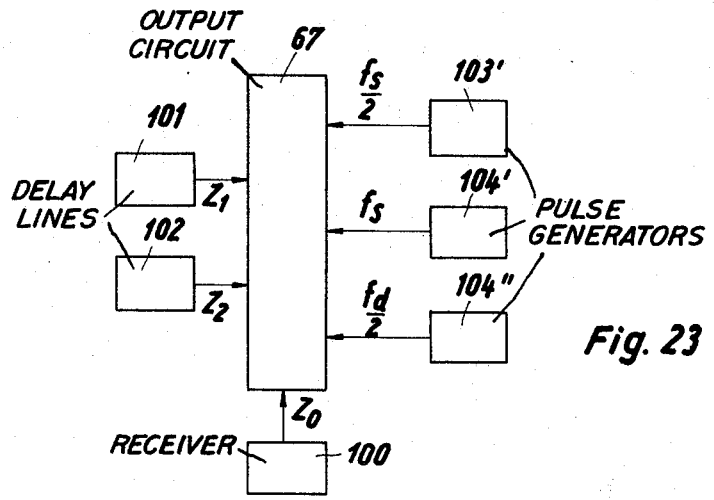
Fig. 23

Inventor:
Alexander Prichodjko
By: Spencer & Kaye
Attorneys

United States Patent Office 3,316,550
Patented Apr. 25, 1967

3,316,550
NAVIGATION SYSTEM
Alexander Prichodjko, Oberelchingen, Kreis Neu-Ulm, Germany, assignor to Telefunken Patentverwertungs G.m.b.H., Ulm (Danube), Germany
Filed July 8, 1963, Ser. No. 293,472
Claims priority, application Germany, July 6, 1962, T 22,421, T 22,422, T 22,423
36 Claims. (Cl. 343—15)

The present invention relates to a navigation system.

More particularly, the present invention relates to a method and apparatus for determining the distance between the plane in which lies a point in space and the plane of symmetry between two high frequency stations which serve for navigational purposes and operate on the transit time principle.

Co-pending application Ser. No. 267,306, filed Mar. 22, 1963, of Alexander Prichodjko, Albert Simianer, and Hartmut Hipp, and co-pending application Ser. No. 270,909, filed Apr. 5, 1963, of Alexander Prichodjko, relate to systems for determining the distance $x$—see FIGURE 1 of the accompanying drawings—between a positional plane $F_P$ containing a point P and the plane of symmetry $F_S$ of two points $E_1$ and $E_2$, spaced apart a known distance $g$, at each of which points $E_1$ and $E_2$ there is a high frequency station. The distance $x$ is calculated by means of a conventional computer which solves the equation $$x = \frac{(e_1 + e_2)(e_1 - e_2)}{2g} \tag{1}$$

where the distance $e_1$ between $E_1$ and P and the distance $e_2$ between $E_2$ and P are determined according to the transit time principle. The algebraic sign of $x$ represents the particular side of the plane of symmetry $F_S$ on which the plane $F_P$ is located.

Systems of the above type may be used for aerial navigation, in which case the points $E_1$ and $E_2$ represent fixed ground stations of known location and the point P the unknown position of an aircraft. As disclosed in the above-mentioned applications, the system may be so arranged that the distance $x$ is calculated either at or in conjunction with one of the ground stations, or at point P, i.e., aboard the aircraft. The calculation, however, involves the formation of sums, differences, products and quotients, and the hardware needed to carry out these tasks is, at least at present, too expensive to permit widespread use.

It is, therefore, an object of the present invention to provide a method and apparatus which operates on the above-described basic principle, i.e., a method and apparatus for determining the distance $x$ on the basis of the above equation, which method and apparatus operate as simply as possible and which require substantially less hardware. With this basic object in view, the present invention resides, basically, in a method and apparatus wherein the distance $x$ between a positional plane $F_P$ containing a point P and the plane of symmetry $F_S$ between two high frequency stations at $E_1$ and $E_2$ which are spaced apart a distance $g$ is determined as follows:

(1) The two expressions $(e_1+e_2)$ and $(e_1-e_2)$ appearing in the above Equation 1 occur during the measurement operation in form of two transit time sections.

(2) These two transit time sections are transformed into pulse trains containing pulses of a pulse repetition frequency $f$ $$f = \frac{c}{g}\sqrt{\frac{g}{2D}} \tag{2}$$

(3) The two numbers of period durations of the pulse repetition frequency $f$ which, when summed up into pulse trains, occupy the same amount of time as the two transit time sections are determined by counting. The two counted values are then multiplied by each other, in the strict mathematical sense.

Here, $e_1$ and $e_2$ represent the paths or distances between $E_1$ and P and $E_2$ and P, respectively, along which travel the time marker signals used before the measurement operation to mark the beginnings and the ends of the transit time sections $T_s$ and $T_d$; $c$ represents the propagation velocity of these time marker signals; and D represents an arbitrarily selectable unit of length into which $g$ is to be substituted.

According to one method for counting the pulse sequences within the transit time sections, the pulse repetition frequency is given in such a manner that the result of the counting operation is numerically equal to the length, in the desired unit of length, of the transit path corresponding to the transit time section. In contradistinction thereto, the pulse repetition frequency of the pulse train is, according to the present invention, given in such a manner that the product formed of the two counted values thereby is numerically equal to the numerical value of the distance $x$.

In order to obtain and to derive (2), Equation 1 can be written as follows:

$$x = x' \cdot D \tag{3}$$

where $x'$ is the numerical value of the distance $x$ between the plane $F_P$ in which lies the point P, and the plane of symmetry $F_S$ which is parallel to $F_P$, with the distance $x$ being measured in an arbitrarily determinable unit of length D.

The magnitude $x'$ represents a product $$x' = p \cdot q \tag{4}$$

whose factors $p$ and $q$, respectively, represent the sum of the pulses of a pulse repetition frequency $f$ counted for the duration of the transit time sections $T_s$ and $T_d$, wherein $$T_s = \frac{e_1 + e_2}{c} \tag{5}$$

and $$T_d = \frac{e_1 - e_2}{c} \tag{6}$$

Using the expressions in Equations 5 and 6 in Equation 4, there is obtained $$x' = \left(\frac{e_1+e_2}{c} \cdot f\right) \cdot \left(\frac{e_1-e_2}{c} \cdot f\right) \tag{7}$$

According to another feature of the present invention, the equation $$f = \frac{n \cdot c}{g} \tag{8}$$

is introduced, wherein $n$ is a dimensionless proportionality constant.

Equation 7 thus becomes $$x' = \frac{(e_1+e_2)n}{g} \cdot \frac{(e_1-e_2)n}{g} \tag{9}$$

which can be re-written as $$x' = \frac{(e_1+e_2)(e_1-e_2)}{2g} \cdot \frac{n^2}{\frac{g}{2}}$$

or
$$x' = x \cdot \frac{2n^2}{g} \quad (11)$$

A comparison between Equations 3 and 11 shows that Equation 3 is true only when $$D = \frac{g}{2n^2} \quad (12)$$

If Equation 12 is substituted in Equation 8, there is then obtained for the pulse repetition frequency $f$ the relationship given in Equation 2, whose validity was to be proved.

The factor $n$ in Equation 8 can be freely selected, it being pointed out, however, that when $n$ is high, a large counting accuracy is obtained. It is expedient, however, additionally to select $n$ such that the numerical value of D in Equation 12 becomes an integral power of ten, so that $x'$ can easily be obtained from $x$ simply by shifting the decimal point to obtain the order of the digits within the numerical expression of $x$.

If $x'$ is to be obtained other than as a numerical value identical to $g$ with reference to the dimension D but in a different dimension $$D' = k \cdot D$$

where $k$ is an arbitrarily selectable constant, it is better not to operate with $$D = \frac{g}{2n^2}$$

according to Equation 12, but instead with $$D' = \frac{g}{2(u \cdot n)^2}$$

in which case, however, it is advantageous to select $(u \cdot n) = n'$ so that D' becomes an integral power of ten.

It is well established that if the sum and difference are formed from two measured values, the difference will always have a larger percentage error than the sum. It is therefore not necessary that the transit time sections $T_s$ and $T_d$ (cf., Equations 5 and 6) be counted out with pulses having the same pulse repetition frequency $f$; instead, the counting operation can, according to another feature of the instant invention, be simplified by using different pulse repetition frequencies $f_s$ and $f_d$, $f_s$ relating to section $T_s$ and $f_d$ to section $T_d$. Here $f_s$ is smaller than $f_d$ and should be selected on the basis of the following.

If $f_s$ and $f_d$, respectively, are substituted for $f$ in Equation 7, there is obtained $$x' = \left(\frac{e_1 + e_2}{c} \cdot f_s\right) \cdot \left(\frac{e_1 - e_2}{c} \cdot f_d\right) \quad (13)$$

Analogously to Equation 8 there is obtained $$f_s = \frac{n_s \cdot c}{g} \quad (14)$$

and $$f_d = \frac{n_d \cdot c}{g} \quad (15)$$

There is thus obtained, according to Equation 12, $$D = \frac{g}{2 \cdot n_s \cdot n_d} \quad (16)$$

and from Equations 15 and 16 corresponding Equation 14, for example, for the frequency $f_s$, there is obtained $$f_s = \frac{c^2}{2 \cdot g \cdot f_d \cdot D} \quad (17)$$

The present invention will now be described in detail, with reference to the accompanying drawings, in which:

FIGURE 1, already referred to above, shows the relative positions of two known points and one unknown point.

FIGURE 7 is a block diagram of a modification of the system of FIGURE 5.

FIGURE 9 is a block diagram showing the details of the actual output circuit incorporated in FIGURE 8.

FIGURE 11 is a block diagram of the second basic embodiment of a system according to the instant invention.

FIGURE 17 is a block diagram showing an inversion of the system according to the second basic embodiment of the invention.

FIGURE 23 shows a modification of a portion of the system of FIGURE 14, in which case the output circuit will likewise be modified as shown in FIGURE 22.

Figure 2:
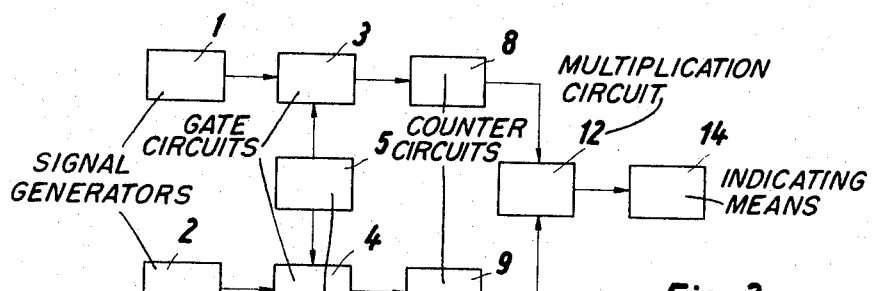
FIGURE 2 is a block diagram of a system according to the present invention.
Figure 3:
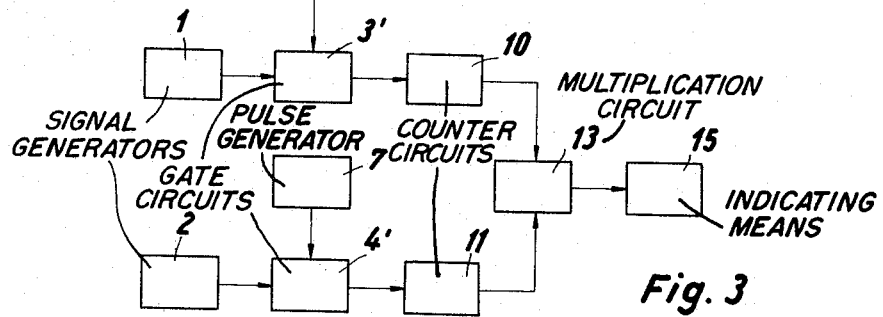
FIGURE 3 is a block diagram of a modified system according to the instant invention.

Referring now once again to the drawings and to FIGURES 2 and 3 thereof in particular, the same show, in block diagram form, two systems according to the present invention for utilizing the information contained in the transit time sections $T_s$ and $T_d$, the circuit of FIGURE 2 operating with a common pulse repetition frequency $f$ and the circuit of FIGURE 3 operating with a first pulse repetition frequency $f_s$ and a second pulse repetition frequency $f_d$.

The output signals of blocks 1 and 2 represent the transit time sections $T_s$ and $T_d$, respectively, and consist each of a pulse for opening the gate circuits 3, 3'; 4, 4', the duration of which pulses corresponds to the duration of the transit time intervals $T_s$ and $T_d$, respectively.

In FIGURE 2, component 5 is a pulse generator producing pulses at the pulse repetition frequency $f$, which pulses are applied to gate circuits 3 and 4, while in FIGURE 3 pulse generators 6 and 7 produce pulses at the pulse repetition frequencies $f_s$ and $f_d$, respectively, which pulses are applied to gate circuits 3' and 4', respectively.

Figure 4:
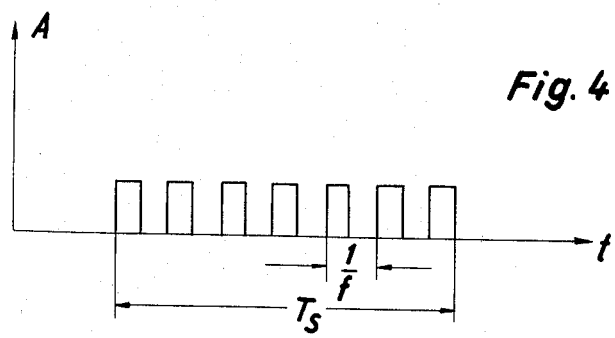
FIGURE 4 shows a pulse train constituting the output of one of the gate circuits of either of the systems of FIGURES 2 and 3.

The output of, for example, gate circuit 3 is the pulse train shown in FIGURE 4, which lasts for a time interval equal to $T_s$. The ordinate of the graph of FIGURE 4 represents the pulse amplitude A while the abscissa represents time $t$. The distance from one pulse to the adjacent pulse is shown to be equal to $1/f$. Similar pulse trains appear at the outputs of gate circuits 3', 4 and 4'. The respective pulse trains are applied to counter circuits 8, 9, 10, 11. Each counter circuit counts the number of pulses contained in the pulse train fed into the counter circuit. The total number of pulses, i.e. the counted value, represents the output of the counter circuit. The outputs of circuits 8 and 9 are applied to a multiplication circuit 12 and the outputs of circuits 10 and 11 to a multiplication circuit 13. Each multiplication circuit multiplies the two counted values applied to it, and the product of the two counted values represents the output of the multiplication circuit. The outputs of the multiplication circuits 12 and 13 are connected to suitable indicating means 14 and 15, respectively.

The output signals of components 1 and 2 of the systems shown in FIGURES 2 and 3 correspond to the transit time sections $T_s$ and $T_d$, respectively. These time sections may be obtained in various ways by means of time marker signals of which three related ones form a signal group. Each signal group consists of a reference signal $Z_0$ and two time marker signals $Z_1$ and $Z_2$, which may be constituted, for example, by the rising flanks of pulses, by phase jumps, by the maxima or the passages through zero of sinusoidal oscillations, by amplitude or frequency changes, and so on.

Figure 1:
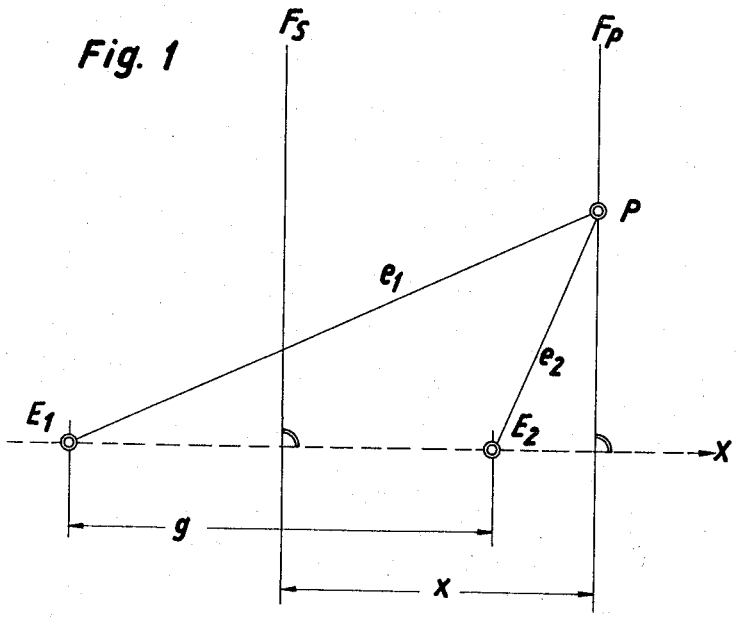

One way of obtaining $T_s$ and $T_d$ is by sending out the reference signal $Z_0$ from a high frequency transmitter station at $E_1$ in FIGURE 1, by picking up this signal, after the same has traversed the distance $e_1$, at the high frequency station at P, which then, in the manner of a transponder, immediately sends out this signal which then again traverses the distance $e_1$—this time in the opposite direction—and is ultimately received by the station at $E_1$. Furthermore, the signal sent out by the station at P, after traversing the distance $e_2$, is also received by the high frequency station at $E_2$.

Figure 5:
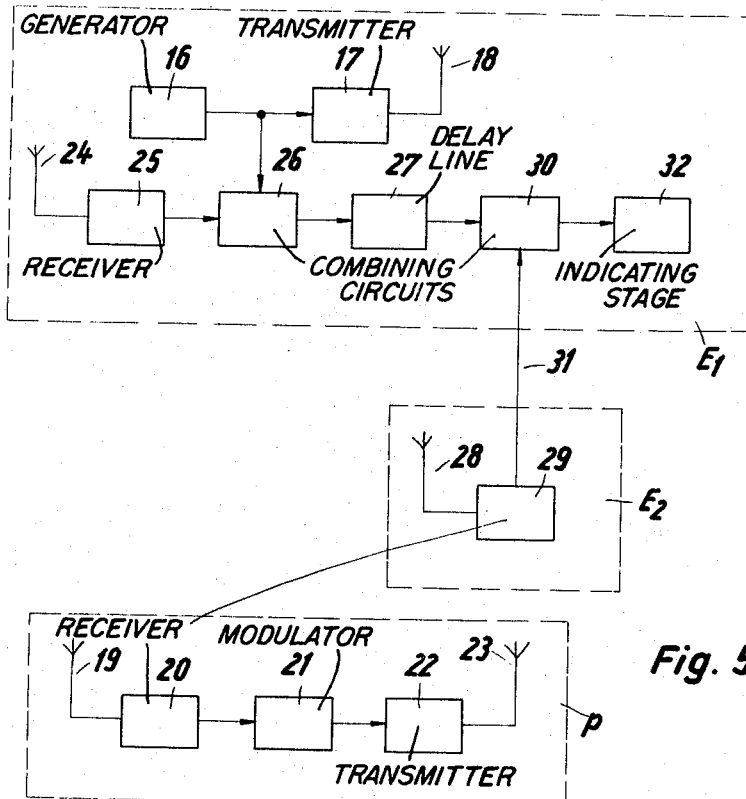
FIGURE 5 is a block diagram of a first basic embodiment of a system according to the present invention.

FIGURE 5 shows one embodiment of a system for carrying out the above operation, the high frequency stations at $E_1$, $E_2$ and P being represented by the dashed rectangles. The reference signal $Z_0$ is produced by generator 16 of station $E_1$ and sent out by a transmitter 17 connected to an antenna 18. After the signal traverses the distance $e_1$, it is received by antenna 19 of the station P. The antenna is connected to a receiver 20 whose output is connected to a modulator 21 which, in turn, is connected to a transmitter 22 having an antenna 23. The signal sent out from P, after again traversing the distance $e_1$, is picked up by antenna 24 located at $E_1$, this antenna being connected to receiver 25. The output of receiver 25 is connected to one input of a combining circuit 26, e.g., an OR-circuit, to whose other input is applied the reference signal $Z_0$. The output of circuit 26 is connected to a delay line 27 which delays the signal by a time interval corresponding to $g/v$, where $v$ is the speed of signal propagation in the transmission lines mentioned in the following. When the transmission line is a radio link then $v = c$.

Figure 6:
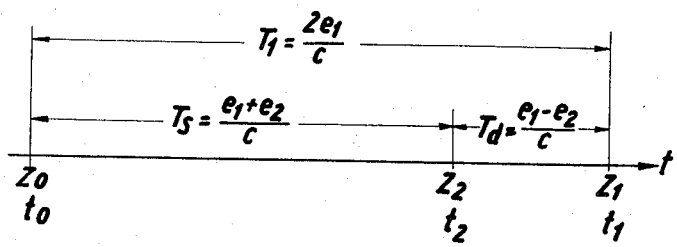
FIGURE 6 shows the timed relationship of signals appearing at the output of one of the components of the system of FIGURE 5.

FIGURE 6 shows the time relationship of signals appearing at the output of delay line 27. The reference signal $Z_0$ appears at instant $t_0$, while the signal $Z_1$ appears at instant $t_1$. Instant $t_1$ follows instant $t_0$ by a time interval $T_1$ whose duration corresponds to the length of the distance $e_1$, i.e.

$$T_1 = \frac{2e_1}{c}$$

Furthermore, the signal sent out by P will, after traversing the path $e_2$, also be picked up at $E_2$, namely, by the antenna 28 connected to receiver 29 (see FIGURE 5). The output of the receiver 29 at $E_2$ is connected with one input of a further combining circuit 30 in $E_1$ by means of a transmission line 31 having a length $g$ (i.e., a length equal to the distance between the stations at $E_1$ and $E_2$) which transmission line propagates a signal at a speed $v$. The other input of circuit 30 is connected to the output of delay line 27.

Consequently, there appears at the output of circuit 30, in addition to the signals occurring at $t_0$ and $t_1$, a further signals $Z_2$ at $t_2$, as shown in FIGURE 6. Here it is assumed—for the sake of consistency with FIGURE 1—that $e_1$ is larger than $e_2$, so that the time interval $T_s$ between $t_0$ and $t_2$ is smaller than the time interval $T_1$. In this case, then, $x$ is deemed to have a positive value.

Accordingly, the output or indicating stage 32 to which circuit 30 is connected will have applied to it the three signals $Z_0$, $Z_1$ and $Z_2$, shown in FIGURE 6.

As shown in FIGURE 7, the values $T_s$ and $T_d$ can be obtained differently, the time relationship of the signals $Z_0$, $Z_1$ and $Z_2$ applied to output stage 32 remaining the same however, assuming, of course, that the other parameters ($g$, $e_1$, $e_2$) are still the same. As is apparent from FIGURE 7, the stations $E_1$ and $E_2$ are connected so that both will transmit signals simultaneously (the delay line 27 producing the same time delay as the transmission line 31). Both signals are received by P, then re-transmitted and ultimately received at $E_1$ whereat they are processed or evaluated.

In practice, the output or indicating stage 32 need not be physically located at $E_1$.

Figure 8:
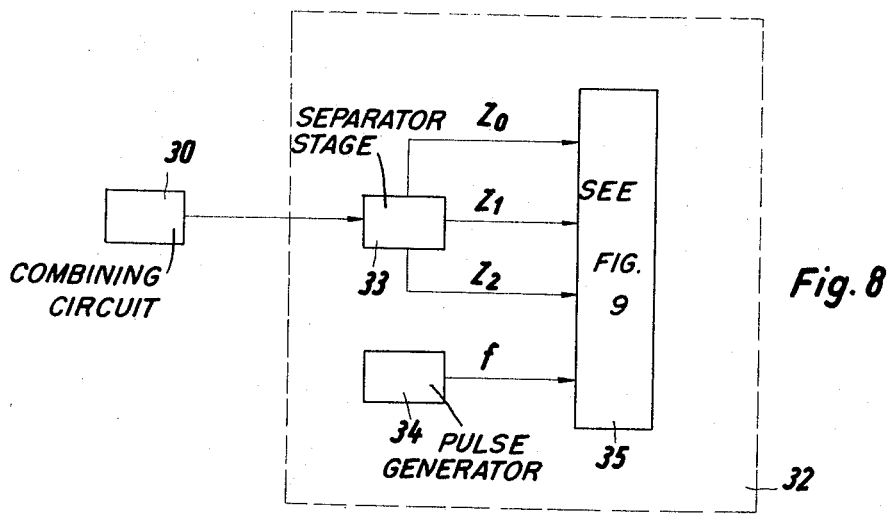
FIGURE 8 is a block diagram showing the details of an output stage forming part of the system of FIGURE 5.

FIGURE 8 shows the details of the output stage 32 of FIGURES 5 and 7. This stage comprises a separator stage 33 for separating the signals $Z_0$, $Z_1$ and $Z_2$. If these signals are in the form of square wave pulses whose rising flanks constitute the time markers, the pulses can be distinguished from each other by making them of different pulse widths. These different pulse widths can readily be produced, in a manner known per se, in the receivers 20 and 25. The separator stage 33 has three output channels that yield the signals $Z_0$, $Z_1$ and $Z_2$, respectively. These three signals, as well as a fourth signal represented by the pulses having a repetition frequency $f$ and produced by pulse generator 34, are then applied to a circuit 35 the details of which are shown in FIGURE 9. As is apparent from that figure, the circuit has four input terminals for receiving the four signals, respectively. The signal $Z_0$ is applied via an AND-circuit 40 to four flip-flops 36, 37, 38, 39, which flip-flops are switched to the L-position before the measurement and thus produce the logic "YES" information at the flip-flop outputs belonging to those flip-flop sections marked by the symbol L in FIGURE 9. The signal $Z_0$ thus causes the first three of these flip-flops to change their switching position while flip-flop 39 remains in the illustrated switching position. This enables the pulses of the pulse repetition frequency $f$ to reach, via AND-circuits 41 and 42, a counter register 43, whereat the pulses of the pulse repetition frequency $f$ are counted. The AND-circuit 42 is open inasmuch as its other input is connected to the output of OR-circuit 44 which has a signal applied to it from the output of AND-circuit 45 and no signal from the output of AND-circuit 46. If, then, a signal $Z_2$ is received at instant $t_2$, the flip-flop 37 is switched back to the illustrated position and the AND-circuit 45 no longer produces an output signal. Inasmuch as the AND-circuit 46 continues not to put out a signal, the AND-circuit 42 will be unable to pass pulses of the pulse repetition frequency $f$ to the counter register 43. Instead, pulses of the pulse repetition frequency $f$ are now applied, via AND-circuit 47, to a counter register 48. The OR-circuit 49 here corresponds to the OR-circuit 44 and the AND-circuit 50 to AND-circuit 45.

When next a signal $Z_1$ appears at instant $t_1$, the flip-flop 38 is returned to the illustrated position, thereby blocking AND-circuits 50 and 47 and thus terminating the counting operation in the counter register 48. The AND-circuit 51 then applies a signal via OR-circuit 52 for returning the flip-flop 36 to the illustrated condition, so that a new measurement can be made.

The outputs of registers 43 and 48 are connected to the inputs of a multiplication stage 53 whose output, in turn, is connected to an indicating stage 53a (cf. components 12 and 14 of FIGURE 2). The algebraic sign of $x$ is represented by the position of the flip-flop 39.

If, however, the signal $Z_1$ appears ahead of $Z_2$, the flip-flop 38 rather than flip-flop 37 will first be actuated. The flip-flop 39 is then switched into its other position by means of a signal via AND-circuit 46. The pulses of the pulse repetition frequency $f$ can then pass through AND-circuit 42 as well as AND-circuit 47 so that both counter registers 43 and 48 will carry out their respective counting operations. When the signal $Z_2$ then arrives at instant $t_2$, the flip-flop 37 is switched, and a switching signal is applied, via AND-circuit 51 and OR-circuit 52, to flip-flop 36, which is thereby switched into the illustrated condition, thus blocking the AND-circuit 41. The other input of OR-circuit 52 is connected to the output of a multiplication stage 53' to whose inputs the signals $Z_1$ and $Z_2$ are applied.

Figure 19:
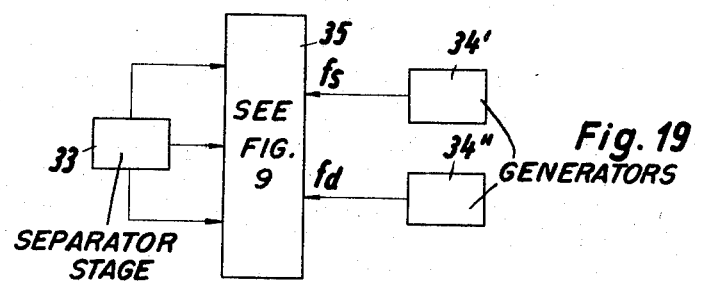
FIGURE 19 shows a modification of the output stage of FIGURE 8.
Figure 20:
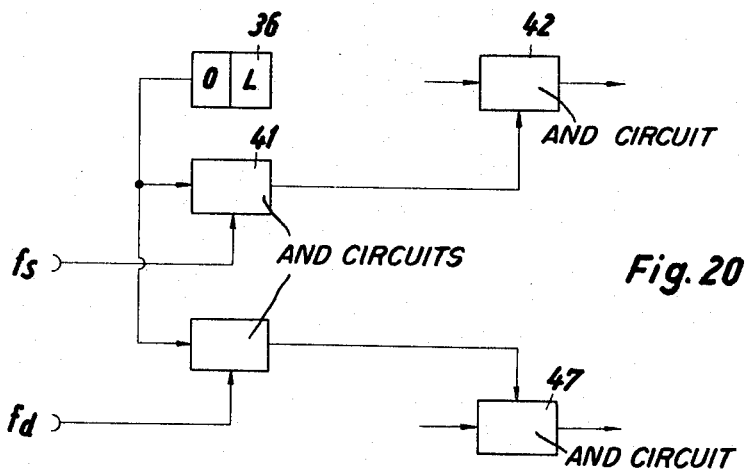
FIGURE 20 shows a modification of the output circuit of FIGURE 9 when the same forms part of the modification of FIGURE 19.

The circuit of FIGURE 9 can be modified so that instead of counting pulses of the pulse repetition frequency $f$ in both counter registers the counter register 43 will count pulses of the pulse repetition frequency $f_s$ whereas the counter register 48 will count pulses of the pulse repetition frequency $f_d$, in which case the single frequency generator of FIGURE 8 will, as shown in FIGURE 19, be replaced by two generators 34' and 34''. The circuit of FIGURE 9 will then be modified as shown in FIGURE 20.

Figure 16:
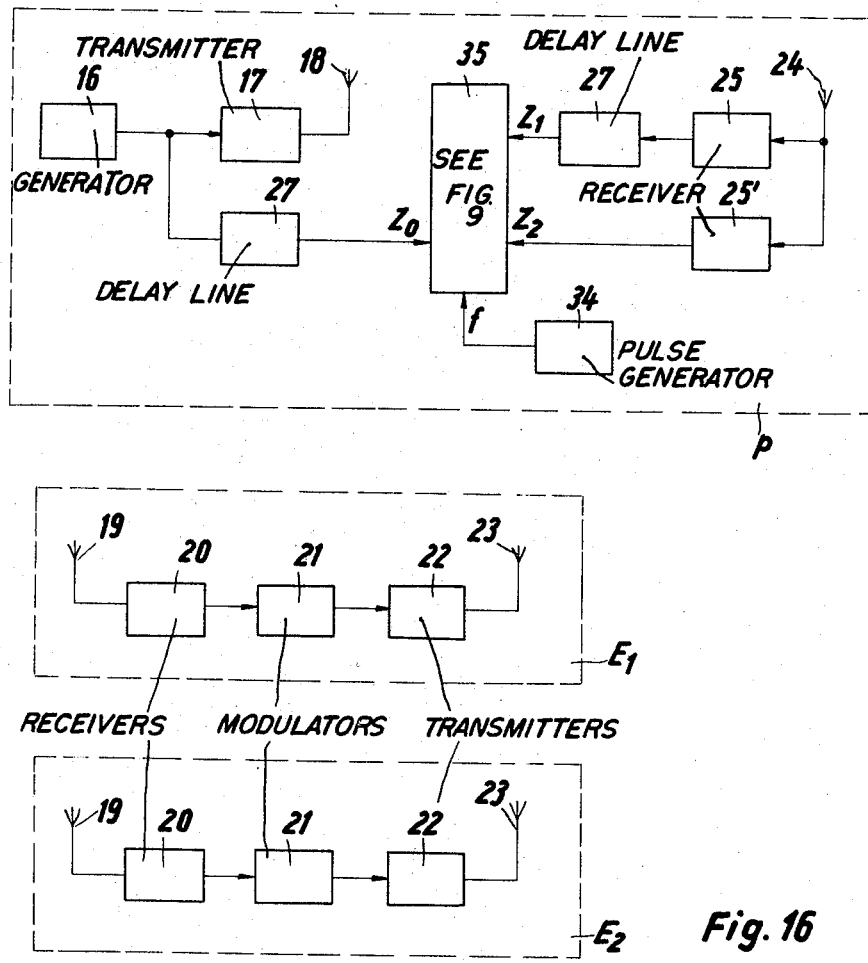
FIGURE 16 is a block diagram showing an inversion of the system according to the first basic embodiment of the invention.

The entire system for obtaining $T_s$ and $T_d$ can be inverted, in a manner of speaking, by letting the station at the point P, whose position is to be plotted, be the one which sends out the reference time marker signal. Such a system is shown in FIGURE 16. Here, the signal sent out by P is picked up by the station at $E_1$, which, now acting as a transponder, thereupon sends out a signal which is received at both P and $E_2$. Here the station at $E_2$ also acts as a transponder in that, upon receipt of the signal from $E_1$, it sends out a signal which is then received at P. In P, the transit time between $E_1$ and $E_2$, i.e., the distance $g$, is compensated for by delaying the signal received from $E_1$ by a time interval corresponding to $g/v$; the reference signal sent out by P is similarly delayed. Thus, there is obtained a time relationship between the signals $Z_0$, $Z_1$ and $Z_2$, as shown in FIGURE 6. In FIGURE 16, the station at P is shown as being equipped with two separate receivers, namely, the receiver 25 for receiving the signal from $E_1$ and a second receiver 25' for receiving the signal from $E_2$.

Figure 10:
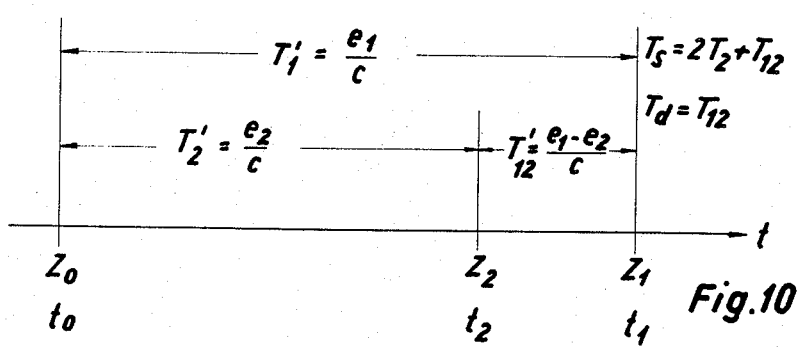
FIGURE 10 shows the timed relationship of signals as they are produced according to a second basic embodiment of the present invention.

According to another embodiment of the present invention, the time intervals $T_s$ and $T_d$ are obtained as follows: The two high frequency stations at $E_1$ and $E_2$ send out, at an instant $t_0$ at which a reference signal $Z_0$ is produced at P, time marker signals which are received at P at instants $t_2$ and $t_1$ as signals $Z_2$ and $Z_1$, respectively. This is shown in FIGURE 10, in which it is assumed that the positions of points P, $E_1$ and $E_2$ correspond to those shown in FIGURE 1. Basically, FIGURE 10 is analogous to FIGURE 6.

FIGURE 11 is a block diagram of a system according to the last-mentioned embodiment. The time marker signals are produced at the transmitter side by a generator 54 whose output is connected to a delay line 55 which delays the signal by a time interval $g/v$. The output of the delay line is connected to a transmitter 56 having an antenna 57 which sends out the signal. Station $E_2$ is connected to station $E_1$ via a transmission line 58 having a length $g$ and electrical characteristics such as transmission line 31, this line 58 serving to synchronize the time marker signal generator 59 at $E_2$ with the time marker signal generator 54 at $E_1$. The output of the delay line is connected to a transmitter 60 having an antenna 61 which sends out the signal. Consequently, the signals are sent out by $E_1$ and $E_2$ in synchronism with each other. These signals are picked up by the antenna 62 at P at instants $t_2$ and $t_1$ as signals $Z_2$ and $Z_1$, respectively. Antenna 62 is connected to receiver 63. The station at P further includes a reference time marker signal generator 64 which produces the signal $Z_0$. All three signals $Z_0$, $Z_1$ and $Z_2$ are applied to the output stage 65.

Figure 12:
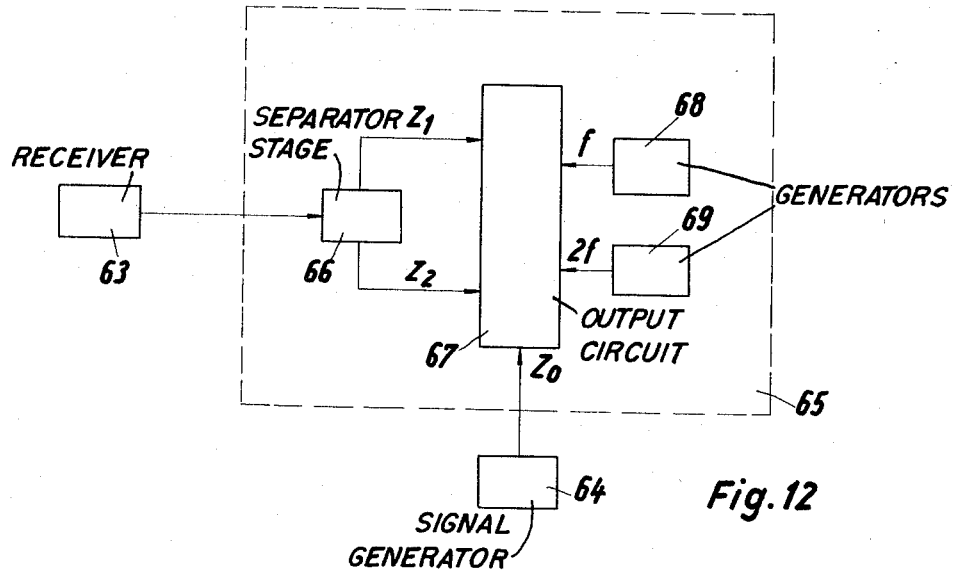
FIGURE 12 is a block diagram showing the details of an output stage forming part of the system according to FIGURE 11.

FIGURE 12 shows the details of the output stage 65. The signals $Z_1$ and $Z_2$ are separated in a separator stage 66, the same corresponding to the separator stage 33 of FIGURE 8. The actual output circuit 67 then has applied to it, at separate input terminals, the three signals $Z_0$, $Z_1$ and $Z_2$, as well as pulses of the pulse repetition frequencies $f$ and $2f$ coming from the generators 68 and 69, respectively.

Figure 13:
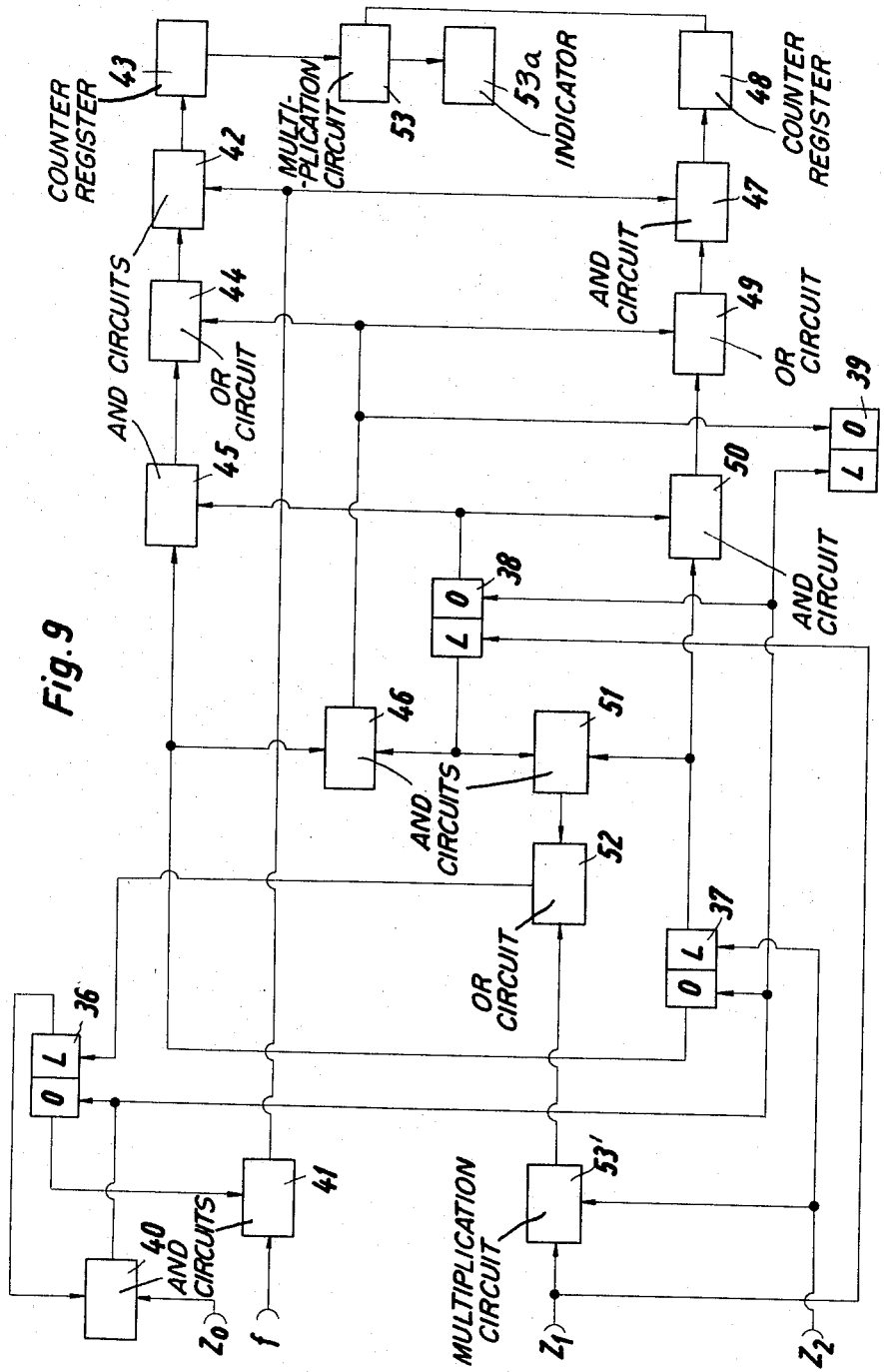
FIGURE 13 is a block diagram showing the details of the actual output circuit incorporated in FIGURE 12.

The details of circuit 67 are shown in FIGURE 13. At first, the flip-flops 70, 71, 72, are in their switching positions as shown. Therefore, when the signal $Z_0$ appears, the same is passed on by the AND-circuit 73. The flip-flop 71 is then switched into its other switching position and the AND-circuit 74 passes pulses of the pulse repetition frequency $2f$, via OR-circuit 75, to the counter register 76. When the signal $Z_2$ appears at instant $t_2$, the same is applied via OR-circuit 77 and AND-circuit 78 to flip-flop 72, thereby switching the same into its non-illustrated switching position. The AND-circuit 74 is thereby blocked and pulses of the pulse repetition frequency $f$ are applied via AND-circuit 79, firstly, to the counter register 80 and secondly, via the OR-circuit 75 to the counter register 76. The counter register 76 thus adds to the series of pulses of pulse repetition frequency $2f$ which were fed into the counter register during the transit time interval $T_s$, a further series of pulses of the repetition frequency $f$ during the transit time interval $T_d$. So long as the flip-flop 72 remains in the non-illustrated switching position, the AND-circuit 85 is blocked and the flip-flop 70 remains in the illustrated switching position. When there then appears the signal $Z_1$ at instant $t_1$, the same is applied via OR-circuit 77, AND-circuit 82 and OR-circuit 83 to flip-flop 71, thereby switching the latter back into its illustrated switching position. This, in turn, causes the flip-flop 72 to be switched back into the illustrated switching position.

If, however, $Z_1$ arrives ahead of $Z_2$, all that additionally happens is that the AND-circuit 81 switches the flip-flop 70 into its non-illustrated switching position, which indicates the fact that the algebraic sign of $x$ is negative.

If $Z_1$ and $Z_2$ arrive simultaneously, they reach flip-flop 71 via AND-circuit 84 and OR-circuit 83, so that this flip-flop is switched back into the illustrated switching position. The register 80 thus remains empty and $x=0$. Also shown is a further AND-circuit 85 which switches the flip-flop 70 into the illustrated switching position if $Z_2$ arrives ahead of $Z_1$ and into the other switching position if $Z_1$ arrives ahead of $Z_2$.

Figure 22:
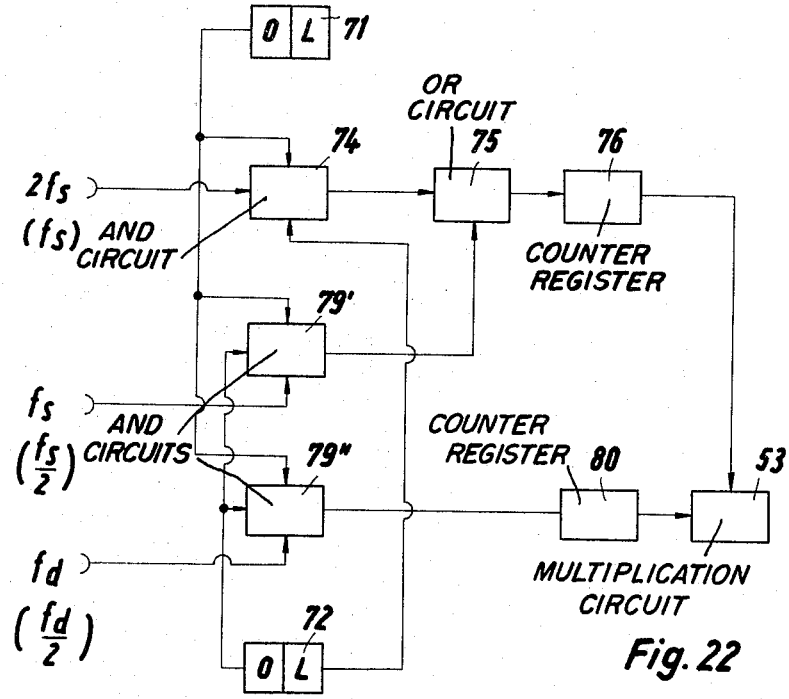
FIGURE 22 shows a modification of the output circuit of FIGURE 13 when the same forms part of the modification of FIGURE 21.
Figure 21:
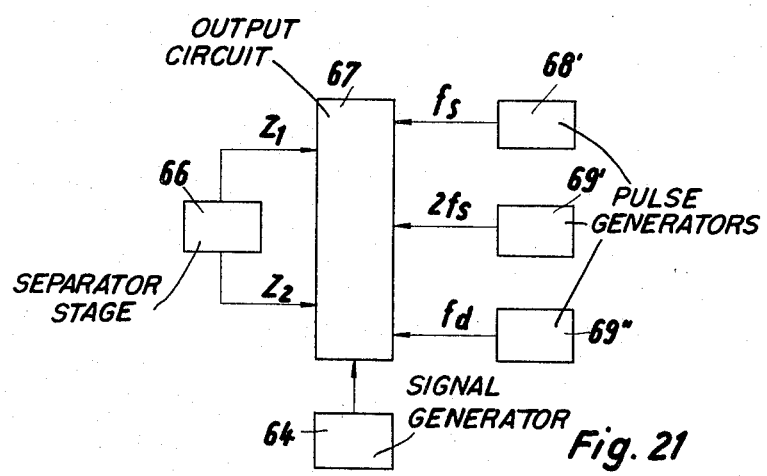
FIGURE 21 shows a modification of the output stage of FIGURE 12.

Instead of using only the pulse repetition frequency $f$ and its harmonics, it is possible to use the pulse repetition frequencies $f_s$, $2f_s$ and $f_d$, in which case the two pulse generators 68 and 69 of FIGURE 12 will be replaced by three pulse generators 68', 69' and 69'' for producing pulses of the pulse repetition frequencies $f_s$, $2f_s$ and $f_d$, respectively, as shown in FIGURE 21. The circuit of FIGURE 13 will then be modified as shown in FIGURE 22. The pulses of the pulse repetition frequencies $f_s$ and $f_d$ are applied to AND-circuits 79' and 79''.

The arrangement last-described may also be inverted, by letting a time marker signal be sent out by P at the instant $t_0'$, which signal is received by the stations at $E_1$ and $E_2$. The signal received at $E_2$ is transmitted to $E_1$, $E_1$ produces a reference signal $Z_0$ at instant $t_0 = t_0' + g/v$, and the signal received at $E_1$ from P is delayed by $g/v$. The time relationship between the signals will again be that shown in FIGURE 10. A system which operates in such a manner is shown in FIGURE 17, wherein $16'$ is the reference signal generator for producing the reference signal $Z_0$ in $E_1$.

Figure 14:
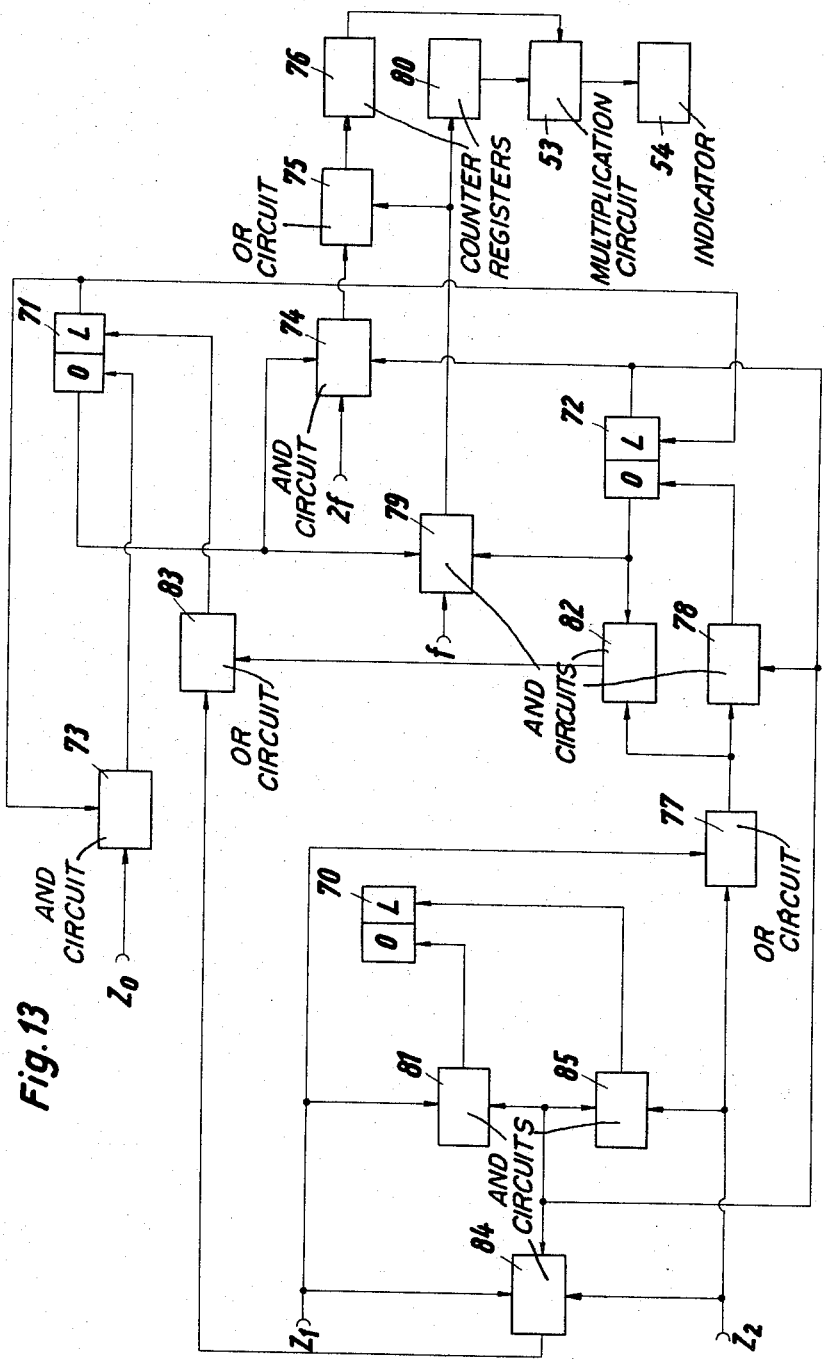
FIGURE 14 is a block diagram of a third basic embodiment of a system according to the present invention.
Figure 15:
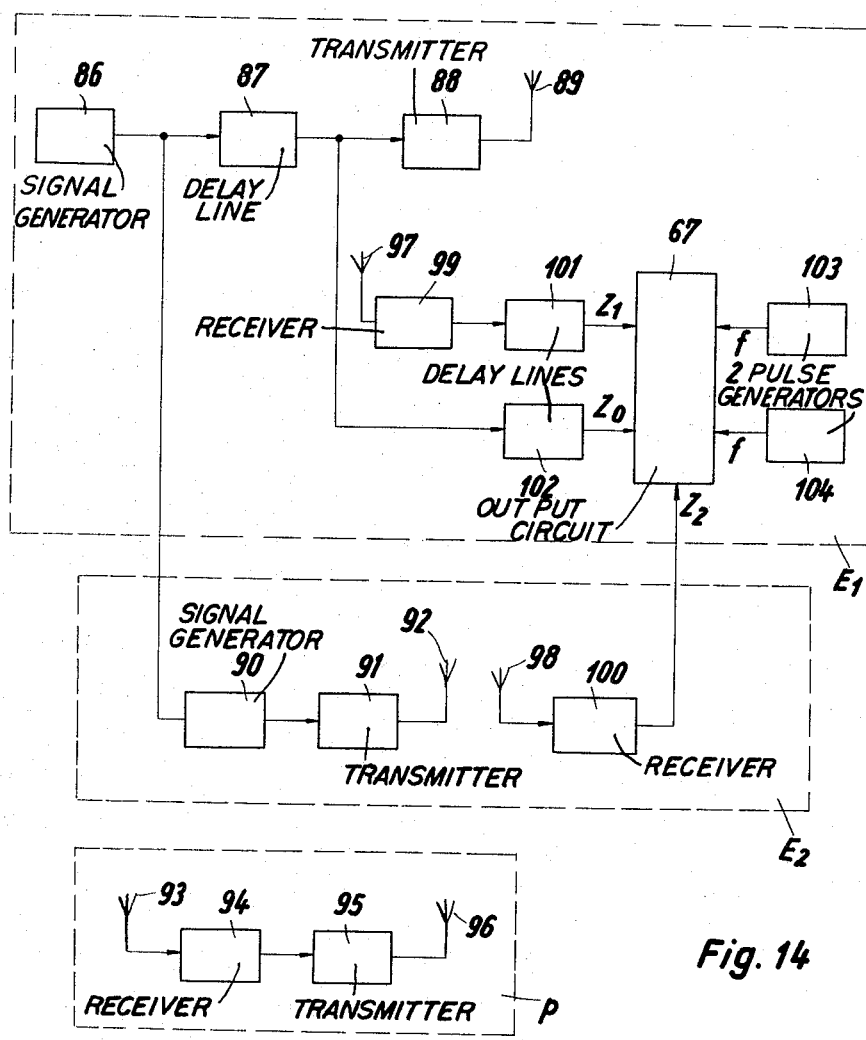
FIGURE 15 shows the timed relationship of signals as they are produced according to the third basic embodiment.

The values $T_s$ and $T_d$ may be obtained yet another way, as follows: each of the stations at $E_1$ and $E_2$ sends out a time marker signal at the instant $t_0$, which signals, after having traversed the distances $e_1$ and $e_2$, respectively, are received at P from whence they are again sent out. Station $E_1$ receives that signal from P which corresponds to the signal originally sent out by $E_1$, while $E_2$ receives from P the signal corresponding to the signal originally sent out by $E_2$. Such a system is shown in FIGURE 14. Signals are generated in $E_1$ by a generator 86, and, after being delayed in delay line 87 by a time interval $g/v$, are sent out at instant $t_0$ by means of the transmitter 88 and antenna 89. This transmission occurs simultaneously with the transmission of the signal from $E_2$, which incorporates a synchronized signal generator 90, a transmitter 91 and an antenna 92. These signals are picked up at P by the antenna 93 and receiver 94, and immediately re-transmitted by transmitter 95 and antenna 96. The signal originally emanating from $E_1$ and re-transmitted by P is then picked up by antenna 97 and receiver 99 in $E_1$, while the signal originally emanating from $E_2$ and re-transmitted by P is picked up by antenna 98 and receiver 100 in $E_2$. A delay line 101, which delays the signal by a time interval $g/v$, is interposed between the receiver 99 and the output circuit 67 (shown in detail in FIGURE 13). A similar delay line 102 is interposed between stages 87 and 67 in order to compensate for the time it takes for the signal to travel from receiver 100 to the output circuit 67. Instead of pulses of the pulse repetition frequencies $f$ and $2f$, the output stage 67 has applied to it pulses of the pulse repetition frequencies $f/2$ and $f$, produced by pulse generators 103 and 104, respectively. Again assuming the relative positions of P, $E_1$ and $E_2$ to be as shown in FIGURE 1, the signals $Z_0$, $Z_1$, $Z_2$, appear as represented in FIGURE 15.

Here, too, the system can be operated, instead of solely with pulses of the pulse repetition frequency $f$ and its sub-harmonics, with pulses of the pulse repetition frequencies $f_s$, $1/2f_s$, and $1/2f_d$, in which case the system of FIGURE 14 will be modified to include, in lieu of the pulse generators 103 and 104, three pulse generators $103'$, $104'$ and $104''$, for producing pulses of the three pulse repetition frequencies $f_s$, $1/2f_s$ and $1/2f_d$, as illustrated in FIGURE 23. FIGURE 22 shows how the system of FIGURE 13 will then be modified. The pulses of the pulse repetition frequencies $f_s$, $1/2f_s$ and $1/2f_d$ are applied to AND-circuits 74, $79'$, and $79''$, as indicated.

Figure 18:
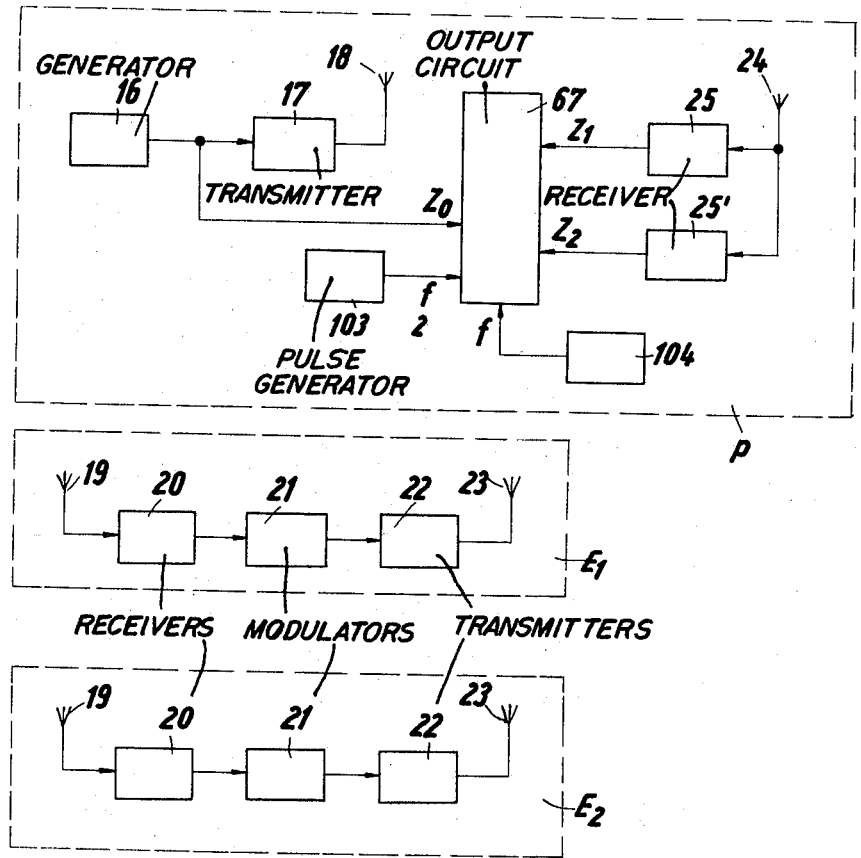
FIGURE 18 is a block diagram showing an inversion of the system according to the third basic embodiment of the invention.

This third embodiment may likewise be inverted. A time marker signal is sent out from P at instant $t_0$, which signal is received by the stations at $E_1$ and $E_2$ which then, in the manner of transponders, re-transmit the signals. These last-mentioned signals are then picked up at P, wherein the time relationship between the signals will be as shown in FIGURE 15. Such a system is illustrated in FIGURE 18.

Insofar as the delay of the time marker signals is concerned, it is pointed out that if the signals are received in a staggered time relationship which is not due solely to the transit time of the signals between P and the fixed points $E_1$ and $E_2$, these signals will, prior to or during the measurment, have to be so delayed that the sum of all delays which are not due to the transit time of the signals between P and the fixed points $E_1$ and $E_2$ is the same for each signal.

These delays can, as described above, be produced by means of delay lines. Basically, however, it is not absolutely essential to make use of such delay lines. Instead, it is in many cases expedient to simulate the delay by letting the counting operation or operations commence not with the value zero but with a positive or negative value which corresponds to the delay. In the arrangements shown in FIGURES 1 and 2, in which the output signals of the components 1 and 2 shall represent the time intervals $T_s$ and $T_d$; this would not be possible if the delays are not compensated for by means of delay lines. For example, in the case where there is no delay compensation, the output signal of block 1 may represent not the time interval $T_s$ but a time interval $T_s + T_v$ where $T_v$ represents the delay not yet compensated i.e. for example $$T_v = \frac{g}{c}$$

or $$T_v = \frac{g}{v}$$

This additional time interval $T_v$ can, in this example, be easily compensated for by setting the counter 8 to a negative starting value equal to $T_v \cdot f$, or by setting the counter 10 to a negative starting value equal to $T_v \cdot f_s$. Similarly, delay time intervals supplemental to $T_d$ can be compensated for by appropriately presetting the counters 9 and 11.

It will be appreciated that, while the above description relates only to the determination of the distance $x$ between a plane $F_P$ and the plane of symmetry $F_S$ between two points $E_1$ and $E_2$ of known location, the position of the point P within the plane $F_P$ can be obtained by determining the distance between a second plane $F_P'$ containing the point P and a second plane of symmetry $F_S'$ of two other stations $E_1'$ and $E_2'$, which plane $F_P'$ forms an angle, preferably a right angle, with the first plane $F_P$. In practice, one of the two points $E_1'$ and $E_2'$ may coincide with one of the points $E_1$ and $E_2$, or the stations $E_1$, $E_2$, $E_1'$, $E_2'$ may be otherwise arranged in any suitable manner so as to form a grid or coordinate system of positional planes so that the location of point P may be definitely fixed, as is fully described in the above-mentioned co-pending applications.

It will also be understood that, particularly if the measurement is to be made at or in conjunction with one of the ground stations, the point P need not necessarily incorporate an active transmitter. That is to say, instead of there being a transponder at P, it may suffice if point P is passive, i.e., if signals transmitted from the ground stations are simply reflected by the aircraft or the like whose position—at point P— is to be determined. Point P may thus "re-transmit" a signal either by acting as a transponder which actually re-broadcasts the signal, or simply by reflecting a signal.

It will be understood that the above description of the present invention is susceptible to various modifications, changes, and adaptations, and the same are intended to be comprehended within the meaning and range of equivalents of the appended claims.

What is claimed is:

1. A method of determining the distance $x$ between a plane $F_P$ containing a point P and the plane of symmetry between two high frequency stations at $E_1$ and $E_2$ which are spaced apart a distance $g$ according to the equation $$x = \frac{(e_1 + e_2)(e_1 - e_2)}{2g}$$

wherein $e_1$ is the distance between P and $E_1$ and $e_2$ is the distance between P and $E_2$, said method comprising the steps of:

(a) producing the factors $(e_1 + e_2)$ and $|(e_1 - e_2)|$ as transit time sections and transforming the same into pulse trains containing pulses of a pulse repetition frequency $$f = \frac{c}{g}\sqrt{2D}$$

wherein $c$ is the propagation velocity of the signals travelling said distances $e_1$ and $e_2$, and D represents an arbitrarily selectable unit of length into which $g$ is to be substituted;

(b) counting the number of pulses of both transit time sections; and (c) multiplying the counted values by each other; and (d) determining whether the transit time between one of the two stations and P is shorter or longer than the transit time between the other of the two stations and P, thereby to derive an algebraic sign for $x$ to indicate on which side of the plane of symmetry $F_S$ the plane $F_P$ lies.

2. The method as defined in claim 1 wherein said factors $(e_1+e_2)$ and $|(e_1-e_2)|$ are obtained as transit time sections $T_s=(e_1+e_2)/c$ and $T_d=|(e_1-e_2)|/c$, respectively, by transmitting a time marker signal from one of the two stations at an instant $t_0$; re-transmitting said signal from P so that the same is received by the other of the two stations at an instant $t_2$ and by said one station at an instant $t_1$, the time difference between $t_2$ and $t_0$ corresponding to the transit time section $T_s$ and the time difference between $t_1$ and $t_2$ corresponding to the transit time section $T_d$; and using the time marker signal and the received signal of said one station and the received signal of said other station in their original time relationship $t_0$, $t_1$, $t_2$ to mark the transit time sections $T_s$ and $T_d$ at the place where the measurement is to be obtained.

3. The method defined in claim 1 wherein said factors $(e_1+e_2)$ and $|(e_1-e_2)|$ are obtained as transit time sections $T_s=(e_1+e_2)/c$ and $T_d=|(e_1-e_2)|/c$, respectively, by transmitting a time marker signal from the one station and from the other station at an instant $t_0$; re-transmitting each of said signals from P so that said one station receives the signal which originally emanated from said one station at an instant $t_1$ and the signal which originally emanated from the other of said stations at an instant $t_2$, the time difference between $t_2$ and $t_0$ corresponding to the transit time section $T_s$ and the time difference between $t_1$ and $t_2$ corresponding to the transit time section $T_d$; and using the time marker signal of one of the two stations and the signals which the one station receives from said one station via P and from said other station via P in their original time relationship $t_0$, $t_1$, $t_2$ to mark the transit time sections $T_s$ and $T_d$ at the place at which the measurement is to be obtained.

4. The method defined in claim 1 wherein said factors $(e_1+e_2)$ and $|(e_1-e_2)|$ are obtained as transit time sections $T_s=(e_1+e_2)/c$ and $T_d=|(e_1-e_2)|/c$, respectively, by producing a reference signal and simultaneously transmitting a marker signal from P; re-transmitting said marker signal from one of the stations; receiving the re-transmitted marker signal from said one station at P as well as at the other of the stations; delaying the reference signal as well as the signal received at P by a time interval corresponding to the transit time between the two stations so that the signals appear at instants $t_0$ and $t_1$, respectively; re-transmitting from said other station the signal received from said one station; receiving the last-mentioned re-transmitted signal at P at the instant $t_2$, the time difference between $t_2$ and $t_0$ corresponding to the transit time section $T_s$ and the time difference between $t_1$ and $t_2$ corresponding to the transit time section $T_d$; and using the delayed reference signal and the delayed signal which P received from the one station and the undelayed signal which P received from the other station in their original time relationship $t_0$, $t_1$, $t_2$ to mark the transit time sections $T_s$ and $T_d$ at the place at which the measurement is to be obtained.

5. The method defined in claim 1 wherein said factors $(e_1+e_2)$ and $|(e_1-e_2)|$ are obtained as transit time sections $T_s=(e_1+e_2)/c$ and $T_d=|(e_1-e_2)|/c$, respectively, said section $T_s$ being transformed into a pulse train containing pulses of a pulse repetition frequency $f_s$ and said section $T_d$ being transformed into a pulse train containing pulses of a pulse repetition frequency $f_d$, wherein $$f_s = \frac{c^2}{2 \cdot g \cdot f_d \cdot D}$$

6. The method defined in claim 1 wherein said factors $(e_1+e_2)$ and $|(e_1-e_2)|$ are obtained as transit time sections $T_s=(e_1+e_2)/c$ and $T_d=|(e_1-e_2)|/c$, respectively, by producing a reference signal at the place at which the measurement is to be obtained and by synchronously transmitting a time marker signal from each of the two stations at an instant $t_0$; at point P receiving and identifying, at an instant $t_1$ after a time interval $T_1=t_1-t_0$, the signal transmitted by one of the stations and, at an instant $t_2$ after a time interval $T_2=t_2-t_0$, the signal transmitted by the other of the stations, where $T_1=e_1/c$, $T_2=e_2/c$, and $T_{12}=|t_1-t_2|=|(e_1-e_2)|/c$, and producing, at the place at which the measurement is to be obtained, numerical values $T_s \cdot f$ and $T_d \cdot f$ corresponding to $T_s=2T_2+T_{12}$ and $T_d=T_{12}$.

7. The method defined in claim 1 wherein the factors $(e_1+e_2)$ and $|(e_1-e_2)|$ are obtained as transit time sections $T_s=(e_1+e_2)/c$ and $T_d=|(e_1-e_2)|/c$, respectively, by producing, at an instant $t_0$, a reference signal at one of the two stations and, at the same instant $t_0$, transmitting a time marker signal from P; receiving the transmitted time marker signal at said one station; delaying the reference signal and the received time marker signal in said one station by a time interval corresponding to the transit time between the two stations so that the signals appear at $t_0$ and $t_1$, respectively; receiving at the other of the stations the time marker signal transmitted by P; re-transmitting from said other station the signal received from P; receiving the last-mentioned re-transmitted signal at said one station at $t_2$, with $T_1=t_1-t_0$, $T_2=t_2-t_0$ and $T_{12}=|t_1-t_2|$; and producing, at the place at which the measurement is to be obtained, numerical values $T_s \cdot f$ and $T_d \cdot f$ corresponding to $T_s=2T_2+T_{12}$ and $T_d=T_{12}$.

8. A method as defined in claim 6 wherein the value $T_d \cdot f$ is represented by a first value; wherein the value $T_s \cdot f$ is represented by the sum of the first value and a second value; wherein the first value is obtained as the number of pulses of the pulse repetition frequency $f$ counted during the time interval $T_{12}$; wherein the second value is obtained as the number of pulses of the pulse repetition frequency $2f$ counted during the time interval $T_2$; wherein the value $T_s \cdot f$ is obtained by adding the first and the second value.

9. A method as defined in claim 7 wherein the value $T_d \cdot f$ is represented by a first value; wherein the value $T_s \cdot f$ is represented by the sum of the first value and a second value; wherein the first value is obtained as the number of pulses of the pulse repetition frequency $f$ counted during the time interval $T_{12}$; wherein the second value is obtained as the number of pulses of the pulse repetition frequency $2f$ counted during the time interval $T_2$; wherein the value $T_s \cdot f$ is obtained by adding the first and the second value.

10. A method as defined in claim 1 wherein the factors $(e_1+e_2)$ and $|(e_1-e_2)|$ are obtained as transit time sections $T_s=(e_1+e_2)/c$ and $T_d=|(e_1-e_2)|/c$, respectively, by producing a reference signal at $t_0$ at the place at which the measurement is to be made; by simultaneously transmitting a time marker signal from each of the two stations at $t_0$; receiving and re-transmitting each of the two time marker signals at P; receiving that re-transmitted time marker signal at the one station at $t_1$ which represents the reply signal for the time marker signal transmitted by the one station; receiving that re-transmitted time marker signal at the other station at $t_2$ which represents the reply signal for the time marker signal transmitted by the other station; applying the reply signals to the place at which the measurement is to be made to obtain thereat, in combination with a reference signal, markings of the three instants $t_0$, $t_1$ and $t_2$, where the time intervals $$T_1 = t_1 - t_0 = 2e_1/c, \quad T_2 = t_2 - t_0 = 2e_2/c$$

and $$T_{12} = |t_1 - t_2| = |2(e_1 - e_2)|/c$$

correspond solely to the transit times of signals and to transit time differences between P and the two stations; and producing numerical values $T_s \cdot f$ and $T_d \cdot f$ corresponding to the sections $T_s = T_2 + T_{12}/2$ and $T_d = T_{12}/2$, respectively.

11. A method as defined in claim 1 wherein the factors $(e_1 + e_2)$ and $|(e_1 - e_2)|$ are obtained as transit time sections $T_s = (e_1 + e_2)/c$ and $T_d = |(e_1 - e_2)|/c$, respectively, by producing a reference signal at $t_0$ at the place at which the measurement is to be made; by transmitting a time marker signal from P at $t_0$; by receiving said transmitted signal from P at the two stations and re-transmitting said received signals from the two stations; by receiving at $t_1$ the re-transmitted signal from one of the two stations at P, by receiving at $t_2$ the re-transmitted signal from the other of the two stations at P, with $T_1 = t_1 - t_0$, $T_2 = t_2 - t_0$, and $T_{12} = |t_1 - t_2|$, and producing, at the place at which the measurement is to be obtained, numerical values $T_s \cdot f$ and $T_d \cdot f$ corresponding to $T_s = T_2 + T_{12}/2$ and $T_d = T_{12}/2$.

12. A method as defined in claim 10 wherein the value $T_d \cdot f$ is represented by a first value; wherein the value $T_s \cdot f$ is represented by the sum of the first value and a second value; wherein the first value is obtained as the number of pulses of the pulse repetition frequency $f/2$ counted during the time interval $T_{12}$; wherein the second value is obtained as the number of pulses of the pulse repetition frequency $f$ counted during the time interval $T_2$; wherein the value $T_s \cdot f$ is obtained by adding the first and the second value.

13. A method as defined in claim 1 wherein the frequency $f$ is so selected that the numerical value of $$D = \frac{c^2}{2 \cdot g \cdot f^2}$$

is an integral power of ten.

14. A method as defined in claim 6 wherein, during the time interval $T_2$, pulses of the pulse repetition frequency $2f_s$ are counted; wherein, during the time interval $T_{12}$, pulses of the pulse repetition frequencies $f_s$ and $f_d$ are counted separately; wherein there is formed the sum of the numerical values of the pulses of the pulse repetition frequencies $f_s$ and $2f_s$ counted during the time intervals $T_2$ and $T_{12}$, respectively, for determining a numerical value $T_s f_s = T_2 \cdot 2f_s + T_{12} \cdot f_s$ corresponding to the section $T_s$; and wherein there is evaluated the value representing the number of pulses of the pulse repetition frequency $f_d$, counted during the time interval $T_{12}$ for determining a numerical value $T_d \cdot f_d = T_{12} \cdot f_d$ corresponding to the section $T_d$, with $$f_s = \frac{c^2}{2 \cdot g \cdot f_d \cdot D}$$

15. A method as defined in claim 7 wherein, during the time interval $T_2$, pulses of the pulse repetition frequency $2f_s$ are counted; wherein during the time interval $T_{12}$, pulses of the pulse repetition frequencies $f_s$ and $f_d$ are counted separately; wherein there is formed the sum of the numerical values of the pulses of the pulse repetition frequencies $f_s$ and $2f_s$ counted during the time intervals $T_2$ and $T_{12}$, respectively, for determining a numerical value $T_s \cdot f_s = T_2 \cdot 2f_s + T_{12} \cdot f_s$ corresponding to the section $T_s$; and wherein there is valuated the value representing the number of pulses of the pulse repetition frequency $f_d$ counted during the time interval $T_{12}$ for determining a numerical value $T_d \cdot f_d = T_{12} \cdot f_d$ corresponding to the section $T_d$, with $$f_s = \frac{c^2}{2 \cdot g \cdot f_d \cdot D}$$

16. A method as defined in claim 10 wherein, during the time interval $T_2$, pulses of the pulse repetition frequency $f_s$ are counted; wherein during the time interval $T_{12}$, pulses of the pulse repetition frequencies $f_s/2$ and $f_d/2$ are counted separately; wherein there is formed the sum of the numerical values of the pulses of the pulse repetition frequencies $f_s$ and $f_s/2$ counted during the time intervals $T_2$ and $T_{12}$, respectively, for determining a numerical value $T_s \cdot f_s$ corresponding to the time section $T_s = T_2 + T_{12}/2$; and wherein there is evaluated the value representing the number of pulses of the pulse repetition frequency $f_d/2$ counted during the time interval $T_{12}$ for determining a numerical value $T_d \cdot f_d = T_{12} \cdot f_d/2$ corresponding to the section $T_d$, with $$f_s = \frac{c^2}{2 \cdot g \cdot f_d \cdot D}$$

17. A method as defined in claim 11 wherein, during the time interval $T_2$, pulses of the pulse repetition frequency $f_s$ are counted; wherein during the time interval $T_{12}$, pulses of the pulse repetition frequencies $f_s/2$ and $f_d/2$ are counted separately; wherein there is formed the sum of the numerical values of the pulses of the pulse repetition frequencies $f_s$ and $f_s/2$ counted during the time intervals $T_2$ and $T_{12}$, respectively, for determining a numerical value $T_s \cdot f_s$ corresponding to the time section $$T_s = T_2 + T_{12}/2$$

and wherein there is evaluated the value representing the number of pulses of the pulse repetition frequency $f_d/2$ counted during the time interval $T_{12}$ for determining a numerical value $T_d \cdot f_d = T_{12} \cdot f_d/2$ corresponding to the section $T_d$, with $$f_s = \frac{c^2}{2 \cdot g \cdot f_d \cdot D}$$

18. A method as defined in claim 5 wherein the frequencies $f_s$ and $f_d$ are so selected that the numerical value of $$D = \frac{c^2}{2 \cdot f_s \cdot f_d \cdot g}$$

is an integral power of ten.

19. A method as defined in claim 1 wherein $$D' = \frac{c^2}{2 \cdot (u \cdot f)^2 \cdot g}$$

where $u$ represents a conversion factor for converting the distance $g$ into the desired unit of length of $x$, $D'$ being equal to $k \cdot D$ where $k$ is an arbitrarily selectable constant.

20. A method as defined in claim 5 wherein $$D' = \frac{c^2}{2 \cdot u^2 \cdot f_s \cdot f_d \cdot g}$$

where $u$ represents a conversion factor for converting the distance $g$ into the desired unit of length of $x$, $D'$ being equal to $k \cdot D$ where $k$ is an arbitrarily selectable constant.

21. A method as defined in claim 1 wherein, in the event the signals are received, at the place where the measurement is to be made with different time delays, where said time delays are not caused by the transmission paths between each of the two stations and P, the counting operation or operations commence with a value or values other than zero, which other value's or values' algebraic sign and magnitude are so selected that the error or errors which such different time delays would introduce in the value or values obtained from the counting operation or operations is or are compensated for.

22. A system for determining the distance $x$ between a plane $F_P$ containing a point P and the plane of symmetry $F_S$ between two high frequency stations at points $E_1$ and $E_2$ which are spaced apart a distance $g$ according to the equation $$x = \frac{(e_1+e_2)(e_1-e_2)}{2g}$$

wherein $e_1$ is the distance between P and $E_1$ and $e_2$ is the distance between P and $E_2$, said system comprising in combination:
 (a) means for producing the factors $(e_1+e_2)$ and $|(e_1-e_2)|$ as transit time sections and transforming the same into pulse trains containing pulses of a pulse repetition frequency $$f = \frac{c}{g}\sqrt{\frac{g}{2D}}$$

wherein $c$ is the propagation velocity of the signals travelling said distances $e_1$ and $e_2$, and D represents an arbitrarily selectable unit of length into which $g$ is to be substituted;
 (b) means for counting the number of pulses of the pulse trains into which both transit time sections have been transformed; and
 (c) means for multiplying the counted values by each other; and
 (d) means for determining whether the transit time between one of the two stations and P is shorter or longer than the transit time between the other of the two stations and P, thereby to derive an algebraic sign for $x$ to indicate on which side of the plane of symmetry $F_S$ the plane $F_P$ lies.

23. The combination defined in claim 22 wherein said means for transforming the transit time sections into pulse trains, said means for counting the number of pulses, said means for multiplying the counted values, said means for determining on which side of the plane of symmetry $F_S$ the plane $F_P$ lies comprises logic circuits.

24. A method as defined in claim 14 wherein the frequencies $f_s$ and $f_d$ are so selected that the numerical value of $$D = \frac{c^2}{2 \cdot f_s \cdot f_d \cdot g}$$

is an integral power of ten.

25. A method as defined in claim 15 wherein the frequencies $f_s$ and $f_d$ are so selected that the numerical value of $$D = \frac{c^2}{2 \cdot f_s \cdot f_d \cdot g}$$

is an integral power of ten.

26. A method as defined in claim 16 wherein the frequencies $f_s$ and $f_d$ are so selected that the numerical value of $$D = \frac{c^2}{2 \cdot f_s \cdot f_d \cdot g}$$

is an integral power of ten.

27. A method as defined in claim 17 wherein the frequencies $f_s$ and $f_d$ are so selected that the numerical value of $$D = \frac{c^2}{2 \cdot f_s \cdot f_d \cdot g}$$

is an integral power of ten.

28. A method as defined in claim 14 wherein $$D' = \frac{c^2}{2 \cdot u^2 \cdot f_s \cdot f_d \cdot g}$$

where $u$ represents a conversion factor for converting the distance $g$ into the desired unit of length of $x$, D' being equal to $k \cdot D$ where $k$ is an arbitrarily selectable constant.

29. A method as defined in claim 15 wherein $$D' = \frac{c^2}{2 \cdot u^2 \cdot f_s \cdot f_d \cdot g}$$

where $u$ represents a conversion factor for converting the distance $g$ into the desired unit of length of $x$, D' being equal to $k \cdot D$ where $k$ is an arbitrarily selectable constant.

30. A method as defined in claim 16 wherein $$D' = \frac{c^2}{2 \cdot u^2 \cdot f_s \cdot f_d \cdot g}$$

where $u$ represents a conversion factor for converting the distance $g$ into the desired unit of length of $x$, D' being equal to $k \cdot D$ where $k$ is an arbitrarily selectable constant.

31. A method as defined in claim 17 wherein $$D' = \frac{c^2}{2 \cdot u^2 \cdot f_s \cdot f_d \cdot g}$$

where $u$ represents a conversion factor for converting the distance $g$ into the desired unit of length of $x$, D' being equal to $k \cdot D$ where $k$ is an arbitrarily selectable constant.

32. A method as defined in claim 18 wherein $$D' = \frac{c^2}{2 \cdot u^2 \cdot f_s \cdot f_d \cdot g}$$

where $u$ represents a conversion factor for converting the distance $g$ into the desired unit of length of $x$, D' being equal to $k \cdot D$ where $k$ is an arbitrarily selectable constant.

33. A method as defined in claim 24 wherein $$D' = \frac{c^2}{2 \cdot u^2 \cdot f_s \cdot f_d \cdot g}$$

where $u$ represents a conversion factor for converting the distance $g$ into the desired unit of length of $x$, D' being equal to $k \cdot D$ where $k$ is an arbitrarily selectable constant.

34. A method as defined in claim 25 wherein $$D' = \frac{c^2}{2 \cdot u^2 \cdot f_s \cdot f_d \cdot g}$$

where $u$ represents a conversion factor for converting the distance $g$ into the desired unit of length of $x$, D' being equal to $k \cdot D$ where $k$ is an arbitrarily selectable constant.

35. A method as defined in claim 26 wherein $$D' = \frac{c^2}{2 \cdot u^2 \cdot f_s \cdot f_d \cdot g}$$

where $u$ represents a conversion factor for converting the distance $g$ into the desired unit of length of $x$, D' being equal to $k \cdot D$ where $k$ is an arbitrarily selectable constant.

36. A method as defined in claim 27 wherein $$D' = \frac{c^2}{2 \cdot a^2 \cdot f_s \cdot f_d \cdot g}$$

where $u$ represents a conversion factor for converting the distance $g$ into the desired unit of length of $x$, D' being equal to $k \cdot D$ where $k$ is an arbitrarily selectable constant.

References Cited by the Examiner
UNITED STATES PATENTS

| | | | |
|---|---|---|---|
| 2,419,525 | 4/1947 | Alford | 343—15 X |
| 2,441,956 | 5/1948 | Deloraine et al. | 343—15 |
| 3,064,929 | 11/1962 | Gard | 343—103 |
| 3,201,792 | 8/1965 | Palmer | 343—103 |

CHESTER L. JUSTUS, *Primary Examiner.*

LEWIS H. MYERS, *Examiner.*

P. M. HINDERSTEIN, D. C. KAUFMAN,
*Assistant Examiners.*